Jan. 21, 1930.
W. F. STROUD, JR., ET AL
1,744,421
FRACTIONAL DISTILLATION
Filed Dec. 17, 1928
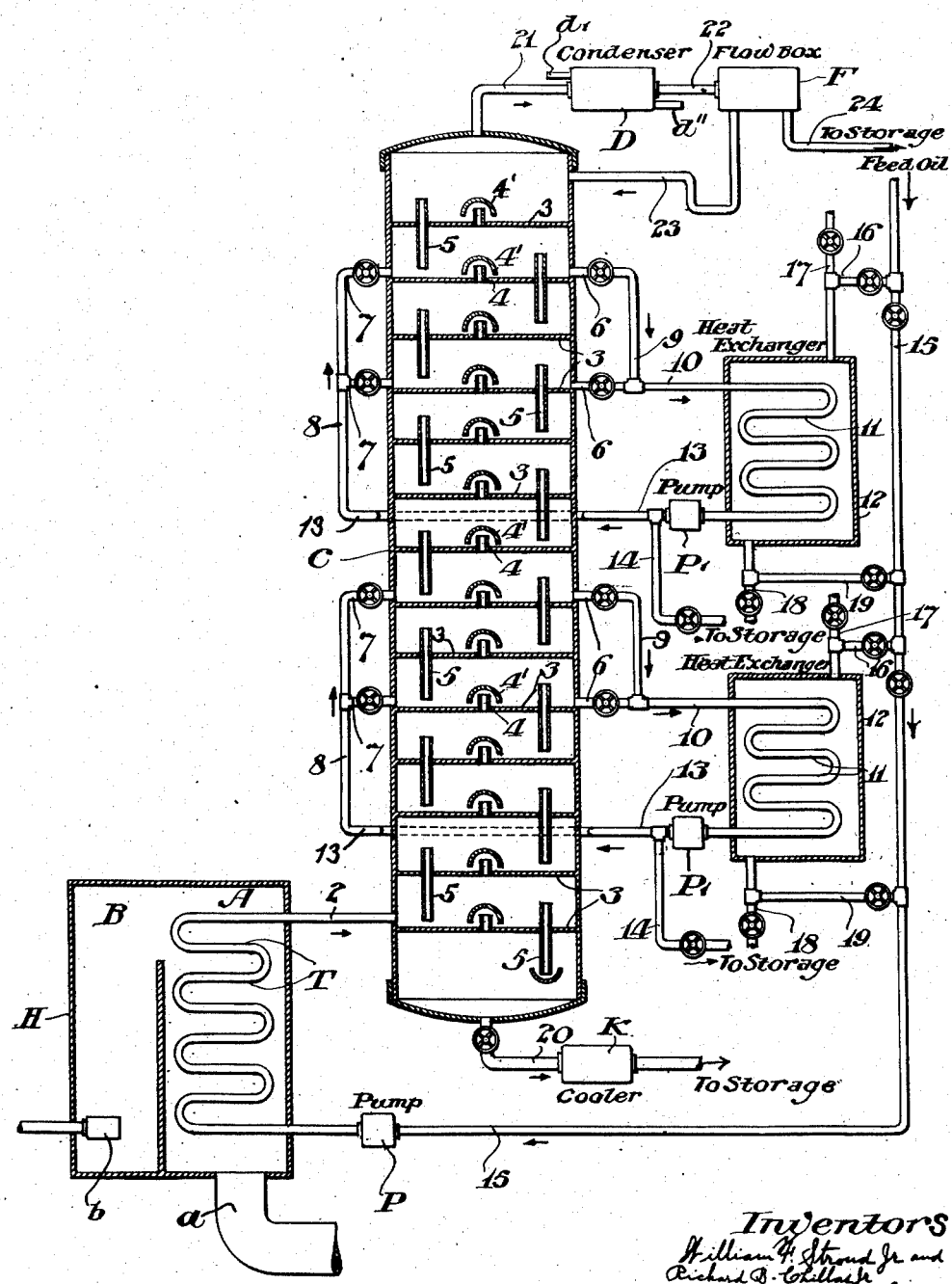

UNITED STATES PATENT OFFICE

WILLIAM F. STROUD, JR., OF MOORESTOWN, NEW JERSEY, AND RICHARD B. CHILLAS, JR., OF PHILADELPHIA, PENNSYLVANIA, ASSIGNORS TO THE ATLANTIC REFINING COMPANY, OF PHILADELPHIA, PENNSYLVANIA, A CORPORATION OF PENNSYLVANIA

FRACTIONAL DISTILLATION

Application filed December 17, 1928. Serial No. 326,634.

The present invention relates to a process of and apparatus for fractional distillation of liquids, such as hydrocarbon oils, alcohols or the like.

In fractional distillation, it is customary to pass the vapors, formed upon heating the liquid to be fractionated to the necessary or desired temperature, into and upwardly through a fractionating column of one of the conventional types, as for example, of the bubble plate, sieve plate or packed column type, in direct contact and heat interchange relation with reflux liquid which is introduced adjacent the top of the column and allowed to flow downwardly therethrough. Fractionation of the vapors into the components desired is dependent upon the transfer of definite quantities of heat from the vapors to the reflux liquid. Such heat transfer results in condensation of the higher boiling portions of the vapors during their passage upwardly, which, due to the liberation of their latent heat of vaporization, causes vaporization of the lower boiling portions of the reflux liquid as it descends, with the result that the vapors become progressively richer in lower boiling components and the reflux liquid becomes progressively richer in higher boiling components.

Since under substantially the same pressure conditions the heat carrying capacity per unit weight of vapors of low boiling liquids at a temperature corresponding to that at which the particular low boiling liquid will boil, is less than such capacity of vapors of high boiling liquids at a temperature corresponding to that at which the particular high boiling liquid will boil, and since under such conditions the volumes of the respective vapors are substantially proportional to their respective weights, in order to take up the heat given up when a given volume of the vapors of high boiling liquids condenses, a greater volume of the vapors of low boiling liquids will necessarily be required. Therefore in effecting a fractional distillation as above described, the volume of vapors within the column progressively increases toward the top, and reaches a maximum in the uppermost portion thereof.

Due to the progressive increase in the vapor volume, the velocity of the vapors likewise progressively increases toward the top of the column. This vapor velocity must, however, be maintained within certain limits, since at higher velocities the vapors will entrain reflux liquid in quantities sufficient to impair fractionation.

In accordance with our invention, some of the heat which by customary methods of fractionation is carried by the continuously increasing volume of vapors to the top of the column, is removed by withdrawing liquid from the column, cooling it and returning it either directly or indirectly to the zone in the column from which it was withdrawn. As a result the vapors which ordinarily would be required to carry from the column the heat so removed, are no longer necessary and the quantity of reflux liquid introduced at the top of the column may be accordingly reduced an appropriate amount. Such reduction of volume of vapors within the column will permit the introduction of more vapors to be fractionated into the column, with a consequent increase in the amount of vapors which may be fractionated in a particular column over a given period of time, or, in other words, an increase in the capacity of the column or in the rate of fractionation.

Further in accordance with our invention, the difference in temperature between the liquid undergoing cooling and the cooling medium may be relatively small, since by regualtion of the rate at which the liquid is circulated into heat interchange relation with the cooling medium the amount of heat removed from the liquid may be controlled. For example, when such temperature difference is relatively small, the liquid to be cooled may be circulated at a rate considerably in excess of the rate at which the liquid is passing downwardly through the fractionating column. Our process is therefore of particular advantage in that heat may be removed in controlled amounts or at controlled rates from the column at particularly desired level or levels.

In apparatus for practicing our process or coming within the scope of our invention only slight alteration of fractionating columns now in use is required. No additional structure is placed within the column, and hence the space therein available for the passage of vapors is not reduced. In fact, the only essential alteration of the usual types of fractionating columns is to connect with the column at the particular point or points at which cooling is desired, suitable pipes or the like for withdrawing the fluid to be cooled from the column and returning it thereto when cooled. This results in an extremely flexible method of control of fractionating conditions within the column and readily permits changes in the location of the point of removal of heat.

By permitting accurate control of the amount of heat removed from the column, as well as permitting control of the point from which it is removed, our process is of particular advantage in distillation of petroleum, which so considerably varies in properties that it is highly desirable to be able to make changes in operating conditions in accordance with the changes in the nature of the oil to be distilled.

In accordance with prior proposals cooling coils or similar structures have been placed within fractionating columns to effect removal of heat therefrom. Such structure occupies space within the column which would otherwise be available for the passage of vapors therethrough, and therefore, the advantage gained by the use of such structure is offset by the additional size of column required for given operating conditions, with the consequent additional cost of such larger column as well as the relatively high cost of the cooling structure itself. Furthermore, without going to considerable expense, such structure is not suitable for change from place to place within the column to meet changes incident to changes in operating conditions.

For a clearer understanding of our invention and to illustrate one of the forms of apparatus suitable for carrying out our process, reference is to be had to the accompanying drawing, more or less diagrammatic in form, in which:

H is a heater of any suitable type, comprising tubes T disposed in the tube chamber A, whose lower end communicates with the stack through a flue $a$, and into whose upper end are discharged from the combustion chamber B the hot gases and products of combustion resulting from burning any suitable fuel, as for example, oil or gas, delivered to the burner $b$.

The liquid to be fractionated is delivered through the pipe 15 to the pump P which passes it at suitable pressure through the tube system T. All or a portion of the liquid may be preheated, as by passing it through heat exchange structure hereinafter described. In the tubes T the liquid is passed countercurrent to and in heat exchange relation with the descending hot gases from combustion chamber B. Upon completing its course through the tubes T, wherein it is vaporized to the extent desired, the heated fluid is discharged through pipe 2 into fractionating column or tower C, here illustrated as of conventional type, equipped with bubble plates 3 which have vapor uptakes 4, bubble caps 4' and downflow pipes 5.

Through valve controlled pipe 20, communicating with the bottom of column C, is withdrawn the liquid, collecting in the bottom of the column, which is passed through cooler K and thence to storage.

Connected with the top of the column C is the pipe 21 through which vapors are conducted from the column to the condenser D cooled by any suitable medium, as water, introduced at $d'$ and discharged at $d''$. The pipe 22 conducts the condensate from condenser D to the flow box F in which it is divided in any desirable proportions into two streams, one of which passes off through the pipe 24 to storage, and the other, used as reflux liquid, passes through the trapped pipe 23 into the upper end of the column C.

With points within the column C below the liquid levels on several of the plates 3 connect valve controlled draw-off pipes 6 which communicate with suitable headers 9, in turn connected by pipes 10 to coils 11 of suitable heat exchangers 12. The outlet ends of coils 11 communicate with pipes 13, equipped with pumps P', and with valve controlled draw-off pipes 14. The pipes 13 in turn connect with headers 8 which join groups of valve controlled return pipes 7.

Line 15 serves as a feed pipe through which oil is introduced into the system. Valve controlled connections 16 join the line 15 to valve controlled inlet pipes 17, delivering cooling medium to the heat exchangers 12, and valve controlled connections 19 likewise join the valve controlled outlet pipes 18 discharging the cooling medium of the respective heat exchangers to the pipe 15. Suitable valves are provided in line 15 just below the points at which connections 16 join therewith, and these valves and valves in connections 16 permit regulation of the flow of feed oil entirely through one or both of the heat exchangers 12, entirely through pipe 15, or partially through one or both of the heat exchange and partially through line 15. In case the feed oil is not used as a cooling medium, any other suitable cooling medium may be used in one or both of the heat exchangers 12. In such instances the valves in connections 16 and 19 would be closed and valves in inlet 17 and outlet 18 would be opened, whereupon the cooling medium would pass into the heat exchanger through 17 and out through 18.

The vapors discharged into column C through pipe 2 pass upwardly therethrough and are brought into contact with reflux liquid introduced into the column through pipe 23. Liquid fractions collect upon each of the plates 3.

To remove heat from the column, the particular plate at the level from which heat is to be removed, is selected. The valves in the outlet or draw-off 6 and inlet or return 7, communicating with the liquid pool on the particular plate, are opened, and valves in the other inlets and outlets in the group are closed. Liquid from the plate is circulated through the heat exchanger and back to the plate at a rate greater or less than the rate at which reflux liquid is passing downwardly through the column. By regulation of the rate at which cooling is effected greater or less amounts of heat may be removed depending upon particular requirements. Through the valve controlled draw-off 14 may be passed to storage a portion of the liquid as a side-stream, if desired.

It is a comparatively simple matter to tap in or connect inlet and outlet pipes below the liquid level on a plate in the column in case the plate at the level from which it is desired to remove heat is not provided with such inlet and outlet. It will be understood therefore that such system as is contemplated by our invention is one of a high degree of flexibility and that our process is of particular advantage in that heat may be removed from a fractionating column at a selected level. Furthermore, it will be understood that upon the rate at which the liquid is circulated in heat exchange relation with the cooling medium depends the amount of heat removed.

By removing a portion of the heat from the column intermediate its top and bottom, as for example, in the manner just described, there will result a decrease in vapor flow to the top of the column since less vapor will be required to carry the remaining heat. Therefore, the rate at which vapors are passed into the column may be increased without increasing the velocity of vapors within the column itself to an extent sufficient to impair fractionation, thereby permitting more vapors to be fractionated in a given column in a given length of time.

It is to be understood that in accordance with this invention, liquid may be withdrawn from the fractionating column and cooled, and may be returned either to the zone or plate from which it was withdrawn or to a zone or plate at a level in the column higher than the level of the zone or plate from which it was withdrawn.

It is to be understood furthermore that our invention while particularly applicable to the treatment of hydrocarbon oils is also applicable to the treatment of alcohols or other liquids to be fractionally distilled.

What we claim is:

1. In the art of fractional distillation, the process which comprises passing vapors upwardly through a plurality of fractionating zones at different levels, passing reflux liquid downwardly in a continuous stream through said zones countercurrent to and in contact with said vapors, withdrawing liquid from one of said zones at a rate in excess of the rate at which reflux liquid is passed therethrough, cooling the liquid so withdrawn, and returning liquid so cooled to a zone at least as high as the zone from which it was withdrawn.

2. In the art of fractional distillation, the process which comprises passing vapors through a plurality of fractionating zones, passing reflux liquid in a continuous stream through said zones countercurrent to and in contact with said vapors, withdrawing liquid from one of said zones at a rate in excess of the rate at which reflux liquid is passed therethrough, cooling the liquid so withdrawn, and returning it to the zone from which it was withdrawn.

3. In the art of fractional distillation, the process which comprises passing vapors through a plurality of fractionating zones, passing reflux liquid in a continuous stream through said zones countercurrent to and in contact with said vapors, withdrawing liquid from one of said zones at a rate in excess of the rate at which reflux liquid is passed therethrough, cooling the liquid so withdrawn, removing a part of the liquid from the system and returning the remainder to the zone from which it was withdrawn.

4. A fractionating system comprising a fractionating column, a plurality of fractionating chambers therein at different levels, means for delivering vapors into said column, means for passing reflux liquid in a continuous stream through said column countercurrent to and in contact with said vapors in the several chambers of said column, connections from a plurality of said chambers for selectively withdrawing liquid therefrom, cooling means, a common connection from said connections to said cooling means, connections with a plurality of said chambers for selectively returning cooled liquid thereto, and a common connection from the discharge of said cooling means to said last named connections.

5. In the art of fractional distillation, the process which comprises passing vapors upwardly through a plurality of fractionating zones at different levels, passing reflux liquid downwardly in a continuous stream through said zones countercurrent to and in contact with said vapors, withdrawing liquid from one of said zones at a rate in excess of the rate at which reflux liquid is passed therethrough, cooling the liquid so withdrawn, removing a part of such liquid from the system, and returning the remainder to a zone at least as high as the zone from which it was withdrawn.

WILLIAM F. STROUD, Jr.
RICHARD B. CHILLAS, Jr.